United States Patent
Stauffer

(10) Patent No.: US 7,947,391 B2
(45) Date of Patent: May 24, 2011

(54) LEAD-ALKALINE BATTERY

(76) Inventor: John E. Stauffer, Greenwich, CT (US)

( * ) Notice: Subject to any disclaimer, the term of this patent is extended or adjusted under 35 U.S.C. 154(b) by 837 days.

(21) Appl. No.: 11/167,535

(22) Filed: Jun. 27, 2005

(65) Prior Publication Data

US 2005/0233216 A1  Oct. 20, 2005

Related U.S. Application Data

(63) Continuation-in-part of application No. 10/756,015, filed on Jan. 13, 2004, now abandoned.

(51) Int. Cl.
*H01M 6/04* (2006.01)
*H01M 4/56* (2006.01)

(52) U.S. Cl. .......... 429/206; 429/225; 429/229

(58) Field of Classification Search .......... 429/207, 429/221, 222, 225, 228, 229
See application file for complete search history.

(56) References Cited

U.S. PATENT DOCUMENTS

| | | | |
|---|---|---|---|
| 1,955,115 A | | 4/1934 | Drumm |
| 3,009,007 A | | 11/1961 | Bryant, Jr. |
| 3,833,427 A | * | 9/1974 | Land et al. .......... 429/153 |
| 3,862,861 A | | 1/1975 | McClelland et al. |
| 4,076,909 A | * | 2/1978 | Lindstrom .......... 429/207 |
| 4,268,589 A | * | 5/1981 | Tamminen .......... 429/207 |
| 4,451,543 A | * | 5/1984 | Dzieciuch et al. .......... 429/206 |
| 5,599,637 A | * | 2/1997 | Pecherer et al. .......... 429/27 |
| 6,183,914 B1 | * | 2/2001 | Yao et al. .......... 429/309 |
| 6,203,939 B1 | * | 3/2001 | Wilson .......... 429/112 |
| 2003/0070910 A1 | * | 4/2003 | Otsuka et al. .......... 204/157.6 |
| 2003/0140483 A1 | * | 7/2003 | Wakabayashi et al. .......... 29/623.1 |
| 2003/0190524 A1 | * | 10/2003 | Phillips .......... 429/223 |

FOREIGN PATENT DOCUMENTS

EP  1555710 A1  7/2005

OTHER PUBLICATIONS

European Search Report dated Sep. 1, 2009 corresponding to European Patent Application No. 06785248.3 based on PCT/US2006/024088.

"Investigations of an Alkaline Electrolyte for Zn-Pb02 Cells" dated Jul. 1, 1973 from Journal of the Electrochemical Society, Electrochemical Society, Manchester, New Hampshire, US, vol. 120, No. 7, pp. 855-857, XP009046653, ISSN: 0013-4651, col. 2, line 11-col. 4, line 31.

* cited by examiner

*Primary Examiner* — Patrick Ryan
*Assistant Examiner* — Muhammad Siddiquee
(74) *Attorney, Agent, or Firm* — Young Basile Hanlon & MacFarlane PC

(57) ABSTRACT

A rechargeable battery is provided such that the positive electrode comprises lead dioxide, the negative electrode zinc, iron, lead or cadmium, and the electrolyte is alkaline. Upon discharge, the lead dioxide is reduced to lead oxide, the metal is oxidized to an oxide, and the electrolyte remains unchanged. The reactions are reversed when the battery is charged.

4 Claims, 1 Drawing Sheet

LEAD-ALKALINE BATTERY

CROSS-REFERENCE TO RELATED APPLICATION

Figure 1:
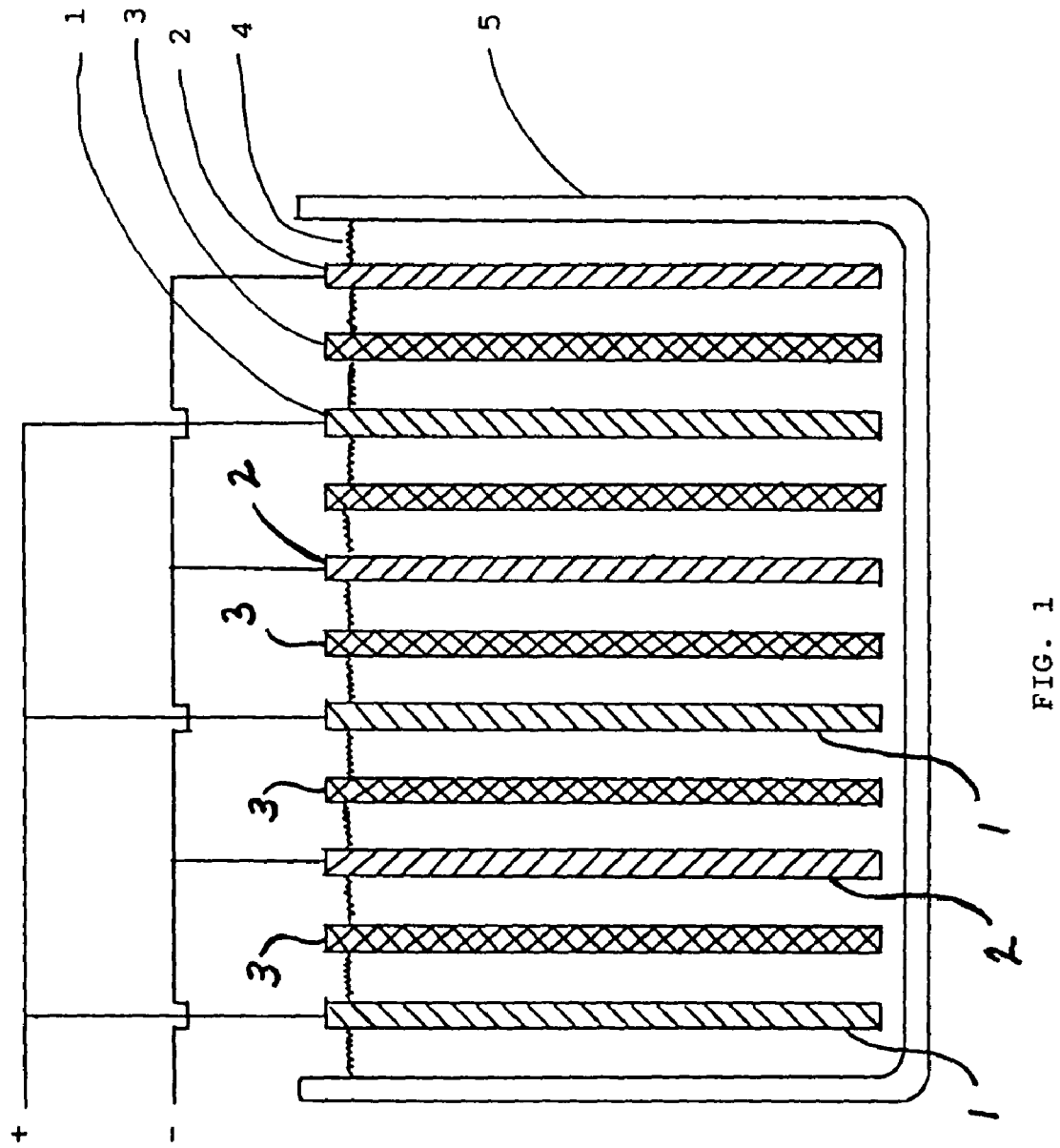

This application is a continuation-in-part application corresponding to U.S. patent application Ser. No. 10/756,015, filed on Jan. 13, 2004.

FIELD OF THE INVENTION

The present invention relates to a novel type of storage battery which is distinguished by its unique electrochemistry. In the charged condition, the positive electrode comprises lead dioxide and the negative electrode comprises zinc, cadmium, lead, iron and/or alloys and combinations of these metals. The electrolyte consists of an alkaline aqueous solution of an alkali metal hydroxide or tetramethyl ammonium hydroxide to which various buffers, including carbonates, borates, silicates, phosphates, and sulfates may be added. Upon discharge the lead dioxide is reduced to lead oxide and the metal is oxidized to an oxide.

BACKGROUND OF THE INVENTION

The most common storage battery, found in almost every vehicle, is the lead-acid battery. This battery comprises a lead dioxide positive electrode, a lead metal negative electrode, and sulfuric acid for the electrolyte. Its chief advantage is low cost. Nevertheless, it has a limited energy density and the electrolyte is extremely corrosive. Furthermore, sufficient acid is required to react with the electrodes during discharge. Maintenance-free types avoid the loss of evolved gases, as disclosed in U.S. Pat. No. 3,862,861, but their cycle-life is still restricted.

The search for alternatives to the lead-acid battery has been ongoing. As far back as 1934, Drumm disclosed the nickel-oxide zinc battery and the silver oxide-zinc battery (U.S. Pat. No. 1,955,115). Both of these batteries employ zinc as the negative electrode and caustic potash as the electrolyte. Nickel oxide or silver oxide serves as the positive electrode. These batteries have improved energy densities and for many uses are a good compromise.

The ideal storage battery would combine the best features of existing batteries with none of the drawbacks. The need for such a battery is apparent for backup systems and in mobile applications. Therefore, it is an object of the present invention to provide an improved storage battery, one that is both economical and highly efficient. These and other objects, features, and advantages of the invention will be recognized from the following description and accompanying figure.

SUMMARY OF THE DISCLOSURE

A rechargeable battery has been developed in which the positive electrode comprises lead dioxide and the negative electrode a metal selected from the group: iron, lead, zinc and cadmium. Upon discharge, the lead dioxide is reduced to lead oxide and the metal is oxidized to an oxide. These reactions are reversed when the battery is charged.

The electrolyte of the cell is alkaline. Aqueous solutions of bases provide the alkalinity. These bases include ammonia and the hydroxides of the alkali metals, namely, lithium, sodium, potassium and cesium. In addition, tetramethyl ammonium hydroxide may be employed.

Certain additives have been found to be effective buffers in the electrolyte. These additives include carbonates, borates, silicates, phosphates and sulfates. They may be introduced by the corresponding acids or their respective salts.

The electrodes of a practical embodiment of the invention may be configured as sheets, fibers, or particles thereby to maximize electrode surface area. Interspersed particles of a carbonaceous material may be used to improve the electrical conductivity. A gelling agent may be added to immobilize the electrolyte. As required, a separator may be employed between the positive and negative electrodes to prevent a short circuit.

WRITTEN DESCRIPTION

The chemistry of the lead-alkaline battery is important in order to gain an understanding of its operation. A positive electrode initially made of lead becomes lead dioxide when charged which is reduced to lead oxide during discharge. In the case where the negative electrode comprises, for example, zinc, this metal is oxidized to zinc oxide when the cell is discharged. The electrolyte is alkaline such that the solution contains an excess of hydroxyl ions. The electrode reactions during discharge can be represented by the following equations:

Positive Electrode:

$$PbO_2 + H_2O + 2e^- \rightarrow PbO + 2OH^- \qquad (1)$$

Negative Electrode $$Zn + 2OH^- \rightarrow ZnO + H_2O + 2e^- \qquad (2)$$

In the above reaction, zinc hydroxide may be an intermediate in the formation of zinc oxide. When these equations are combined, the reaction for the cell is:

$$PbO_2 + Zn \rightarrow PbO + ZnO \qquad (3)$$

In the overall reaction, there is no change in the average composition of the electrolyte during discharge although there may be concentration gradients.

During recharging of the cell, the reactions are reversed. Thus, lead oxide is oxidized to lead dioxide and zinc oxide is reduced to zinc metal. The emf necessary for charging is supplied by an external power source. The discharge-recharge cycle can be repeated endlessly, thus fulfilling the function of a storage battery.

A particularly difficult challenge in designing new batteries is identifying electrode materials that will undergo electrochemical reactions and still withstand corrosion by the electrolyte. Although theory is helpful in this respect, empirical data are required to prove the effectiveness of materials—both for the electrodes and the electrolyte. One measure of the relative performance of a cell is its open-circuit voltage. Another consideration is cycle life.

The use of lead in an alkaline cell may seem questionable because lead in the +2 oxidation state commonly forms plumbous salts containing the positive divalent ion $Pb^{++}$. However, by the action of hydroxides on plumbous compounds it is possible to form the negative ion $HPbO_2^-$ which is soluble in aqueous solutions. Accordingly, $Pb(OH)_2$ is regarded as an amphoteric hydroxide. In a similar manner, concentrated solutions of alkali hydroxides act upon the dioxide $PbO_2$ to form plumbate ions, $PbO_4^{-4}$ and $PbO_3^{-2}$, which are likewise soluble.

In view of these considerations, one goal of the research on new cells was to control the concentration hydroxides in the electrolyte. This result was made possible by employing solutions of sodium carbonate which react as follows:

$$Na_2CO_3 + H_2O \leftrightarrow NaOH + NaHCO_3 \qquad (4)$$

From this equation it is seen that such solutions are strongly alkaline. The carbonic acid set free on hydrolysis does not escape when the base is strong but forms the bicarbonate. However, hydrolysis can be reduced by increasing the concentration of the sodium carbonate, thus permitting a degree of control over the formation of hydroxide.

In place of carbonates, borates can be employed to similar advantage. Boric acid is a weak acid, much more mild than carbonic acid. Thus, its salts tend to hydrolyze in solution. The following equation shows the reaction of potassium meta borate in solution to form potassium hydroxide and potassium tetra borate.

$$2K_2B_2O_4 + H_2O \leftrightarrow 2KOH + K_2B_4O_7 \quad (5)$$

Again the hydroxyl concentration can be controlled by adjusting the concentration of the potassium borate.

Carbonates and borates are effective not only in controlling the alkalinity of the electrolyte, but they also form insoluble salts with lead. In this manner the corrosion of the positive electrode can be minimized. Not only are carbonates and borates helpful in this regard, but other salts are likewise effective. Silicates, phosphates and sulfates form insoluble salts with lead.

Alkalinity can be provided by compounds of the alkali metals including lithium, sodium, potassium, and cesium. Lithium has certain limitations inasmuch as its carbonate and phosphate are almost insoluble in water. Cesium provides a very strong base but the cost of this material limits its potential applications. While ammonium hydroxide is basic in solution, its volatility restricts its use. Finally, tetramethyl ammonium hydroxide is known to be strongly alkaline, approaching that of sodium hydroxide and potassium hydroxide.

The present invention covers the use of aqueous solutions for the electrolyte. These solutions have the advantage of superior electrical conductivities. Although use of organic solvents including alcohols and glycols is feasible, their performance is inferior.

The configuration of a lead-alkaline cell is not restricted. For purposes of testing various combinations of electrodes and electrolytes, a simple cell was assembled from a glass jar and strips of metal separated, as need be, by a polypropylene sheet. A workable battery, however, would necessarily be designed with the maximum surface areas for the electrodes and minimum volume of electrolyte. Such geometric designs as parallel plates, either flat or spirally wound, are appropriate. Alternatively, particles of lead and metal either alone or interspersed with graphite may be employed. In this manner, the capacity of the cell can be increased and its internal resistance minimized.

To gain a greater appreciation of the present invention, FIG. 1 illustrates its distinctive features. The cut-away perspective shows a lead-zinc battery comprising a single cell with its electrodes arranged as flat parallel plates. The lead dioxide positive electrodes 1 and the zinc negative electrodes 2 are kept apart by separators 3. These parts are immersed in the alkaline electrolyte 4, which is contained in casing 5. This sectional view also shows the electrical leads attached to the electrodes. An advantage of this design is that by placing the positive and negative electrodes in close proximity to each other the quantity of electrolyte is reduced.

Applications of a secondary battery as provided by the present invention are almost limitless. The largest application is in vehicles including automobiles powered by new hybrid motors. Other uses include portable electronic devices such as cell phones and laptop computers.

EXAMPLES

Example No. 1

The electrolyte was prepared by heating 100.0 gm. Of potassium bicarbonate in an oven to convert it to potassium carbonate, which was then dissolved in 185 ml. of water. The positive electrode was formed from a 1½ in. wide strip of lead and the negative electrode was a 1½ in. wide strip of steel. The cell comprised a glass jar about 2¾ in. diameter by 2½ in. high. After charging the cell at 2.5 volts for 21 minutes an open circuit potential of 1.7 volts was observed. At the end of the run both electrodes were in good condition and the electrolyte was water-white.

Example No. 2

The electrolyte was prepared by heating 106.3 gm. of sodium bicarbonate in an oven to convert it to sodium carbonate, which was dissolved in 250 ml. of water and 10 ml. of concentrated sulfuric acid. Two strips of lead 2 in. wide were used for the positive and negative electrodes. The cell comprised a glass jar 2½ in. diameter by 4 in. high. After charging the cell at 2.4 volts for 9 minutes an open circuit potential of 1.5 volts was observed. Both electrodes were dimensionally stable.

Example No. 3

The same cell was used as in Example 2, but 3.7 gm. of sodium hydroxide pellets were added to the electrolyte. Also, a zinc electrode was substituted for the negative lead electrode. After charging the cell at 2.5 volts for 3 minutes an open circuit of 2.1 volts was obtained. The electrodes remained in excellent condition after repeat cycling.

Example No. 4

A cell per Example No. 3 can be constructed using cadmium as the negative electrode.

What is claimed is:

1. A storage battery comprising:
   (a) a positive electrode consisting essentially of lead which charging, converts to lead dioxide;
   (b) a negative electrode consisting essentially of zinc; and
   (c) an alkaline electrolyte consisting of an alcohol solution of a base.

2. The storage battery of claim 1, wherein the base is sodium hydroxide.

3. The storage battery of claim 1, wherein the base is potassium hydroxide.

4. The storage battery of claim 1, wherein the base is cesium hydroxide.

* * * * *